United States Patent [19]

Dudouyt

[11] Patent Number: 4,509,806
[45] Date of Patent: Apr. 9, 1985

[54] POST ASSEMBLY FOR KNOCK-DOWN FURNITURE

[76] Inventor: Jean-Paul Dudouyt, Les Camelias, Place des Palniers, 44500 La Baule les Pins, France

[21] Appl. No.: 368,775

[22] Filed: Apr. 15, 1982

[30] Foreign Application Priority Data

Apr. 16, 1981 [FR] France ............................... 81 07706

[51] Int. Cl.³ .............................................. A47B 88/00
[52] U.S. Cl. .............................. 312/257 SK; 312/140; 108/111
[58] Field of Search ............................... 108/111, 153; 312/257 SK, 263, 257 R, 265, 257 SM, 140; 211/187

[56] References Cited

U.S. PATENT DOCUMENTS

| 690.874 | 1/1902 | Powers | 312/140 |
| 940.299 | 11/1909 | Bierend | 312/140 |
| 1.030.444 | 6/1912 | Zabel | 312/140 |
| 2.546.564 | 3/1951 | Roselyn | 312/140 |
| 3.182.812 | 5/1965 | Fenwick | 211/187 X |
| 3.674.327 | 7/1972 | Robinson | 312/257 |
| 3.876.270 | 4/1975 | White | 312/257 R |

FOREIGN PATENT DOCUMENTS

| 12230 | 12/1967 | Japan | 312/140 |
| 21414 | 3/1900 | Switzerland | 312/140 |

Primary Examiner—William E. Lyddane
Assistant Examiner—Peter A. Aschenbrenner
Attorney, Agent, or Firm—Edwin E. Greigg

[57] ABSTRACT

According to the invention, each corner post includes an exterior section having the general shape of an angle iron, the intersecting sides of which are intended to comprise the corresponding corner of the furniture, and an interior section substantially receiving the plane bisecting the corner as a plane of symmetry, the interior section including at least one tubular element capable of receiving at each of its ends a self-tapping screw or some other means for the fixation, at the lower end, of a shoe or foot with the possible interposition of a lower partition pierced by the screw and, at the upper end, of the top of a piece of furniture or of a cap covering the tip of the corner, while at least one of the sections, either exterior or interior, is provided with detent means preventing the lateral displacement of the partitions forming the corresponding angle of the furniture.

10 Claims, 9 Drawing Figures

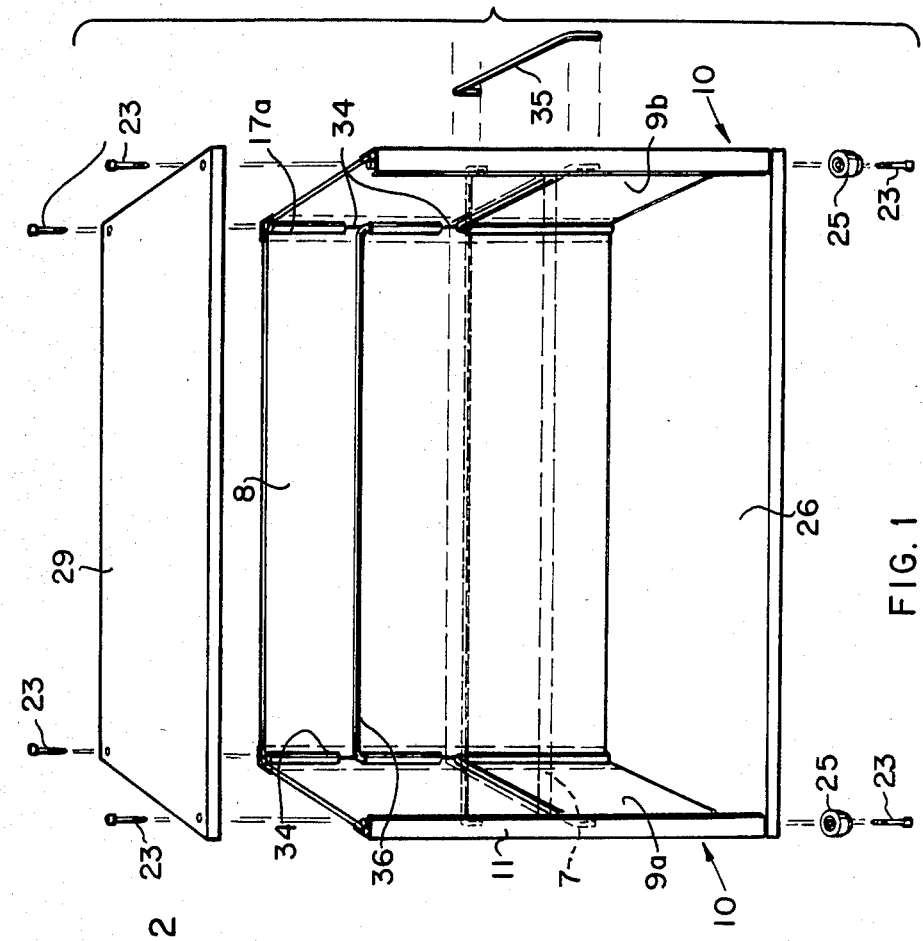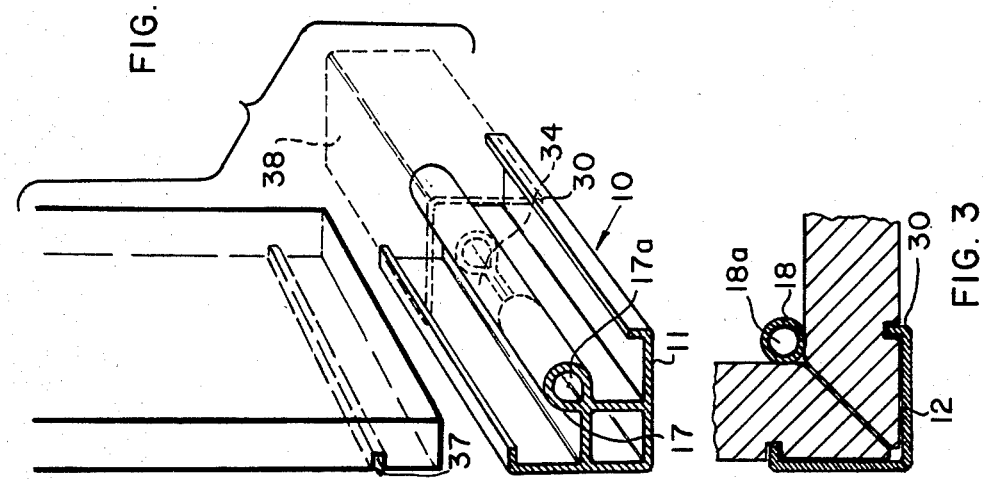

POST ASSEMBLY FOR KNOCK-DOWN FURNITURE

The invention relates to corner posts for knock-down furniture, the structure of which is such that assembling the furniture is effected by means of interlocking and/or sliding elements. The furniture, once assembled, remains firmly assembled as a result of the emplacement of a simple screw or other means of fixation at each of the ends of the corner posts, even in the case of a large-sized piece of furniture.

According to the invention, each post includes an exterior section having the general shape of an angle iron, the intersecting sides of which are intended to comprise the corresponding corner of the furniture, and an interior section substantially receiving the plane bisecting the corner as a plane of symmetry. The interior section includes at least one tubular element capable of receiving at each of its ends a self-tapping screw or some other means for the fixation, at the lower end, of a shoe or foot, with the possible interposition of a lower partition pierced by the screw and, at the upper end, of the top of a piece of furniture or of a cap covering the tip of the corner, while at least one of the sections, either exterior or interior, is provided with detent means preventing the lateral displacement of the partitions forming the corresponding angle of the furniture.

The two sections, interior and exterior, of each post may be in one piece or not. In the latter case, they may be simply juxtaposed or assembled by sliding one into the other.

A structure of this kind not only permits extremely easy and rapid assembly but also makes possible multiple combinations to make up shelving, etageres, cupboards, tables, desks and even chairs.

The invention will be better understood from a reading of the ensuing description and from the appended drawings, which in a non-limiting fashion illustrate various embodiments of a post according to the invention, and in which:

FIG. 1 is a perspective view of the body of a cupboard;

FIG. 2 is a perspective view of a segment of the post in a preferred embodiment, having above it a partitioning element intended for interlocking with this segment;

Figure 8:
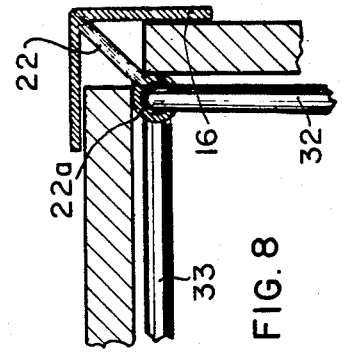
Figure 9:
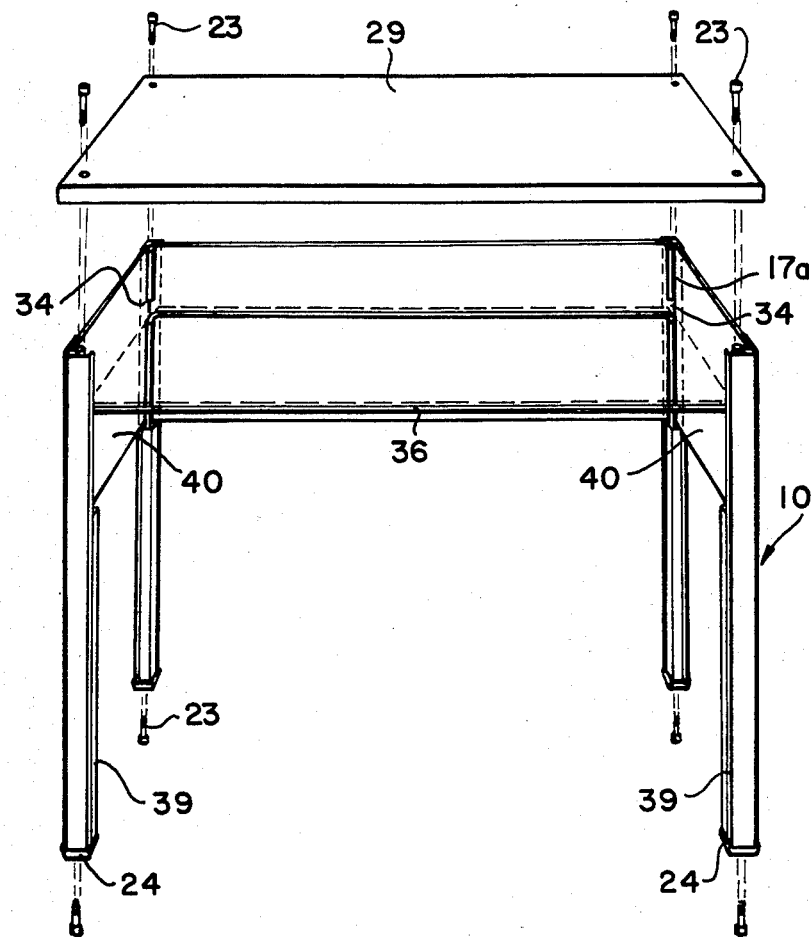

FIGS. 3-8 each show one variant of the post having separate interior and exterior sections (FIGS. 3 and 6), juxtaposed sections (FIG. 4), interlocked sections (FIG. 7) or interior and exterior sections all in one piece (FIGS. 5 and 8); and FIG. 9 is a perspective view showing the application of the invention to a table which has a shelf.

In FIG. 1, the parallelepiped body of a cupboard comprises two lateral partitions 9a and 9b, one rear partition or back 8, one lower partition 26 and one top 29. These various elements are assembled with four corner posts 10. The interior faces of the lower partition 26 and of the top 29 may be provided with sockets in the vicinity of the front posts 10 for receiving the hinges of doors (not shown).

Each post 10 includes an exterior section having the general shape of an angle iron, the intersecting sides of which comprise the corresponding corner of the cupboard, and an interior section, the sides of the lateral and rear partitions being pressed against the interior faces of the flanges of the angle iron and enclosing the interior section.

FIGS. 2-8 show various possible realizations of the exterior and interior sections. In all cases, the interior setions (17-21) extend rigidly over the entire length of the post and include, at least at each end, one tubular element (17a-21a) intended for receiving a self-tapping screw 23. In the case of the cupboard of FIG. 1 or the table with a shelf of FIG. 9 (see above), the screw 23 of the upper end passes through the top 29 of the piece of furniture, and the screw 23 of the lower end, in the case of the cupboard of FIG. 1, passes through a foot 25 and the lower partition 26 and, in the case of the table of FIG. 9, passes through a simple shoe 24.

Detent means are furthermore provided on either the exterior or interior section or both, in order to prevent the lateral displacement of the partitions.

In the simplest embodiment (FIG. 3), the exterior section is an angle iron 12, each flange of which has one edge 30 bent back at an angle of 90° toward the interior, in order to cooperate with a groove 37 (FIG. 2) provided on the exterior face of the corresponding partition, parallel to the post. The junction of the two partitions forming the corner of the piece of furniture is realized in mitred fashion, and the interior section is a simple tube 18 placed inside the corner, the internal diameter 18a of which is slightly less than the diameter of the self-tapping screws 23. In a variant embodiment (FIG. 6), the end of each partition, cut at a 45° angle, includes a groove of semicircular cross section, and the tube 18 is accommodated within the thickness of the partitions. Better stability of the assembled furniture is thereby attained. These two kinds of embodiment are essentially reserved for furniture of the cupboard type (FIG. 1), the possible shelves 7 being supported by standard brackets or by pins inserted into holes provided on the interior faces of the lateral partitions. On the front face, that is, the opening side, a molding of appropriate cross section is slid between the 45° angle of the lateral partition and the bent edge 30 opposite the corner.

Figure 5:
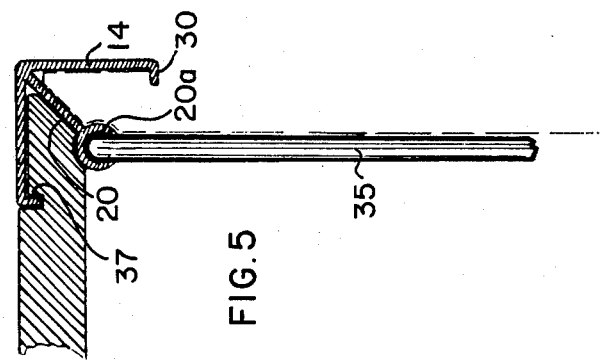
Figure 4:
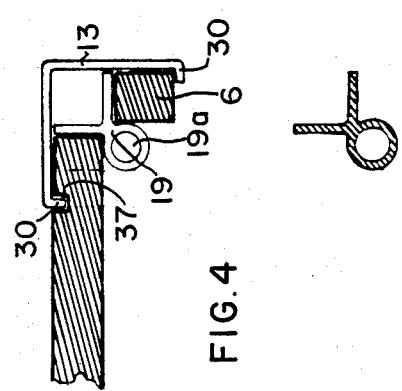

In the forms of embodiment shown in FIGS. 2, 4 and 5, the detent means of the partitions are likewise made up of the bent edges 30 of the exterior section 11, 13 or 14 in the form of angle irons, the partitions including mating grooves 37.

Figure 7:
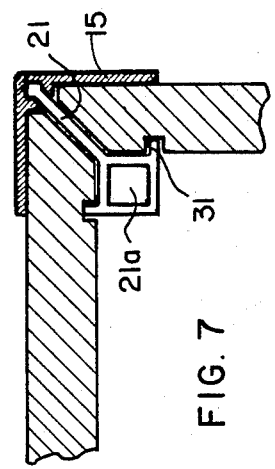

In FIG. 7, it is the interior faces of the partitions which include a groove now cooperating with a longitudinal rib carried by the interior section 21 assembled by sliding it into the angle of the angle iron. This arrangement is equally appropriate for the embodiments of FIGS. 2 and 5, because it is sufficient that the two interior and exterior sections be interlocked or joined together. It is also possible to provide both the bent edges 30 and the ribs 31 to be disposed with grooves on the two faces of the partitions.

Figure 6:
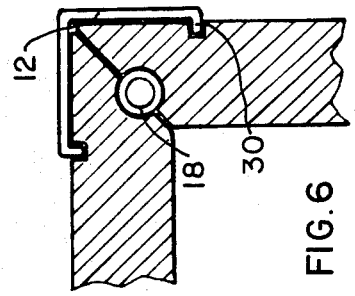

In the example shown in FIG. 4, the interior section 19 is separate from the exterior section 13, as in the case of FIGS. 3 and 6; this necessitates the provision of a molding such as 6 on the opening side of the furniture. This interior section then takes the form of a corner, supporting a tube 19a of circular cross section on its exterior, along its intersecting sides.

In the embodiments shown in FIGS. 3, 5 and 8, the interior and exterior sections are made in one piece, the tubular element 17a, 20a, 22a being connected to the angle iron 11, 14, 16 by a simple partition 20, 22 or two partitions (FIG. 2), which with the flanges of the angle iron 11 form a coupled tube of square cross section.

Except in the case where the interior section is a simple tube 18 (FIGS. 3 and 6), the tubular element 17a, 19a, 20a, 21a or 22a may have discontinuities such as 34 (FIGS. 1, 2 and 9) which permit the emplacement of rods 32, 33, 34, 35, 36 (FIGS. 1, 5, 8 and 9) the ends of which are bent at an angle of 90° and form supports for the shelves 7 and/or for the interconnecting means which connect one post to another and which, in the case of FIG. 8, represent the sole detent means preventing the displacement of the partitions.

All these partitions may be produced by drawing (or extrusion), for example of aluminum or an alloy of aluminum, the discontinuities 34 being effected by means of milling or sawing. In order to facilitate manufacture, especially when two tubular elements are coupled (as in the case of FIG. 2), which necessitates the juxtaposition of two support struts, the tubular element 17a intended for receiving the screws 23 may include a longitudinal slit, the screws 23 then being selected with a slightly larger diameter to make them self-tightening.

When the exterior section includes bent edges 30 and the interior section is located entirely within the parallelepiped defined by the flanges of the exterior section, as is the case in FIGS. 2, 4 and 5, standard angle iron segments 38 may slide within the exterior section 11, 13 and 14, being guided by the bent edges 30. A tube of substantially square section (even if the flanges of the segments 38 are slightly indented) is thus formed, surrounding the interior section and thus forming a closed, tubular leg 39 for a table or a table with a shelf or, again, for support and spacer blocks for the shelves or for the partitioning elements 40 (FIG. 9). Thus the partitions may be placed in the open or on top of the legs 39, forming the "waist" of a "French desk".

Other combinations are equally possible. For instance, for a desk or a table, the post of FIG. 2 is preferably selected, and the top 29 is fixed not with the screw 23 but with wedges forced into the tubular element having the square cross section. For other applications, this square tubular element makes it possible to cut gear teeth on the vertical shaft of a pivoting wheel at the lower end, so as to leave the cylindrical tubular element 17a free for the screw 23 with which the furniture is assembled. If the front posts are short and the rear posts are longer, it is possible to make a chair, the seat being like a shelf and the back and arms of the chair being like the partitions, and the angle of inclination of the seat back may be determined by the form which the upholstery of this back assumes. Likewise, the post assembly of the invention can be applied to the construction of small containers, boxes or carriers, beach shelters, and even urban fixtures such as benches, bus stop shelters, and the like.

It will furthermore be understood that other forms of embodiment than those shown in the drawings may be adopted, in particular for the interior section and quite particularly for the connection between the tubular element and the angle iron, without departing from the scope of the present invention.

I claim:

1. A post assembly for knock-down furniture comprising an exterior section having the general shape of an angle iron with intersecting sides which are intended to form the corresponding corners of a piece of furniture formed by partitions, and an interior section having upper and lower ends, said interior section connected to the exterior section, substantially receiving the plane bisecting the corner as a plane of symmetry and intended for preventing a transverse displacement of the partitions forming corresponding sides of the furniture by being applied against the internal faces of these partitions, in which said interior section includes, at least at each of its ends, one section of a tubular element which is in contact with the partitions and sufficiently closed to cooperate with a securing means for securing a cover means at a lower end of said post such as a lower partition pierced by said securing means and securing at an upper end of said post covering means and at least one section of said post is provided with detent means cooperating with lateral means carried by the partitions of the furniture for preventing the displacement of said partitions.

2. A post assembly as defined by claim 1, in which the exterior sections and interior sections are formed in a single piece.

3. A post assembly as defined by claim 1, in which the interior section is assembled with the exterior section by sliding inside the angle of the latter element.

4. A post assembly as defined by claim 1, in which said tubular section of the interior section is tubular over its entire length with cut-away sections which enable the inserting into said tubular section the bent end of a metal rod in order to form a bracket.

5. A post assembly as defined by claim 1, in which said detent means preventing the lateral displacement of the partitions are embodied on said exterior section of said post and directed at 90° toward the interior of the edge of each of the flanges of the exterior section and on the partitions for the grooves cut into their exterior faces.

6. A post assembly as defined by claim 5, in which the interior section of said post is accommodated in its entirety within a parallel-piped space formed by the two adjacent sides of the post which are made up of the flanges of the exterior section in the form of an angle iron with segments that slide within the exterior section, guided by the bent edges, are segments of standard angle iron such as to embody closed legs and/or support and spacer blocks for shelves or partitioning elements.

7. A post assembly as defined by claim 2, in which the connection between the exterior section and the interior section forms, with the flanges of the angle iron, a side-by-side tube of square cross section.

8. A post assembly as defined by claim 2, in which the tubular part of the interior section has a longitudinal slit.

9. A post assembly as defined by claim 8, in which the longitudinal slit of the tubular part includes discontinuities spaced apart regularly in such a manner as to enable the realization of a rack integrated with the post assembly in which said rack is capable of detachably receiving support stops inserted in a regulatable manner in each post at a corner of a piece of furniture in order to support a set of shelves at selected height.

10. A post assembly as defined by claim 1 in which said securing means are threaded screws.

* * * * *